Figure 1:
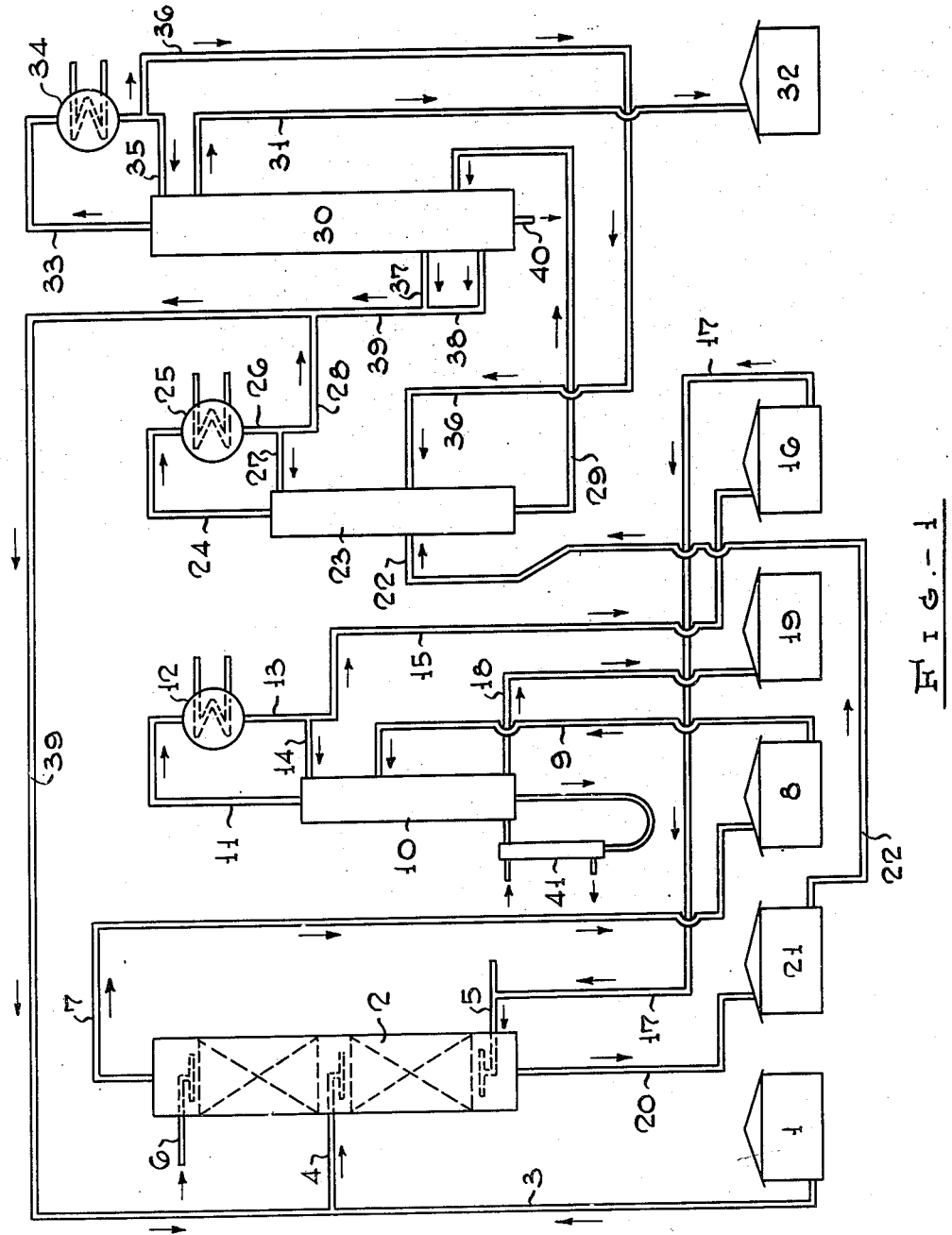

June 6, 1950   R. W. EGBERTS ET AL   2,510,806
PURIFICATION OF CRUDE ALIPHATIC ALCOHOLS
Filed March 5, 1947   2 Sheets-Sheet 1

Raymond W. Egberts
John Hooton   Inventors

By Henry Berk   Attorney

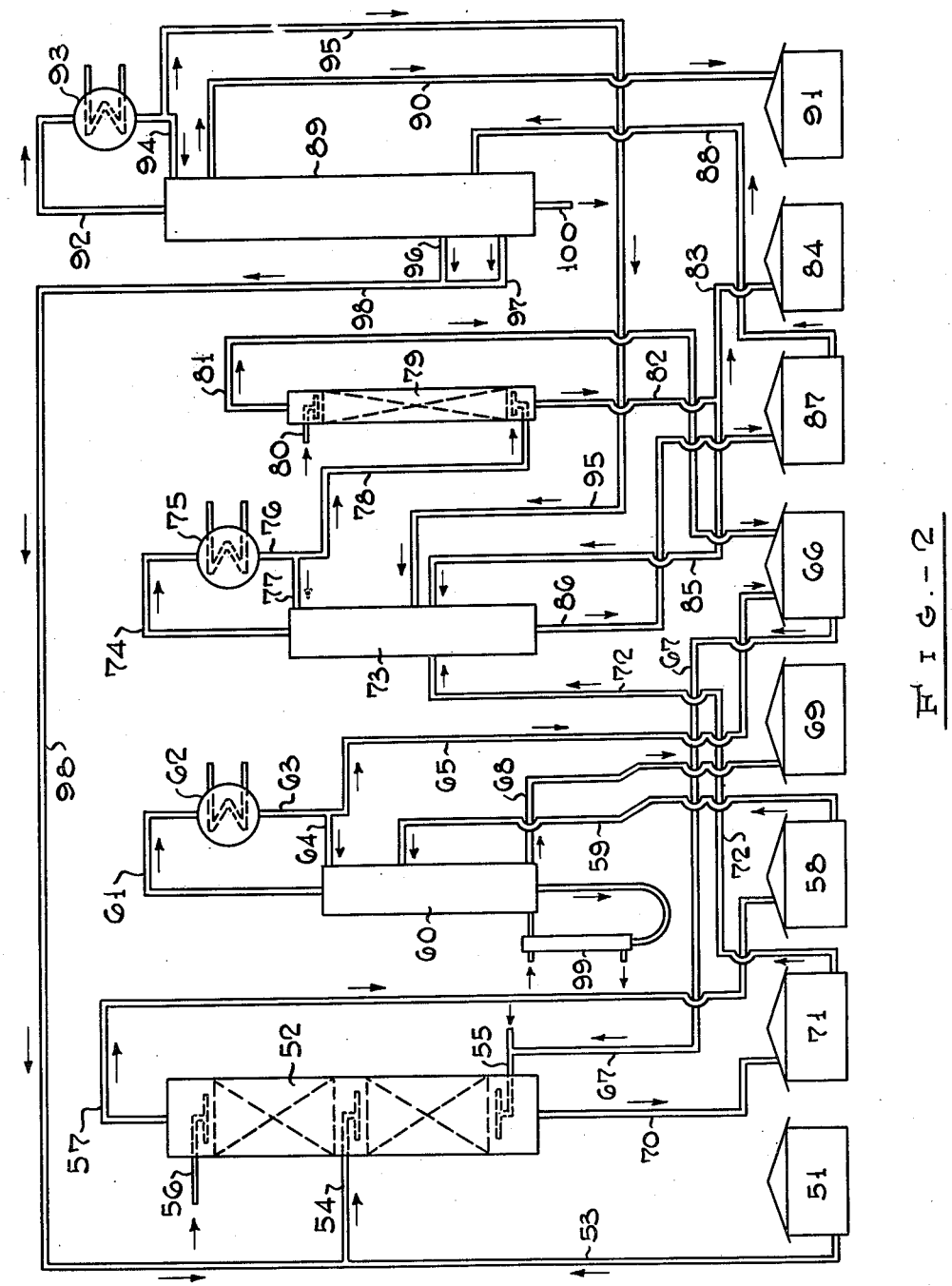

Patented June 6, 1950

2,510,806

UNITED STATES PATENT OFFICE 2,510,806

PURIFICATION OF CRUDE ALIPHATIC ALCOHOLS

Raymond W. Egberts, Roselle, and John Hooton, Linden, N. J., assignors to Standard Oil Development Company, a corporation of Delaware Application March 5, 1947, Serial No. 732,436

5 Claims. (Cl. 260—643)

This invention relates to the removal of high-boiling, substantially water-insoluble oils from aliphatic monohydric alcohols containing two to four carbon atoms per molecule. The object is to improve the purity of the alcohol product. More specifically, high-boiling, substantially water-insoluble oils are efficiently separated from aliphatic monohydric alcohols containing two to four carbon atoms per molecule by a combination extraction with water and a low-boiling, substantially water-insoluble organic selective solvent.

Alcohols of the above group are generally manufactured in commercial quantities by the hydration of olefins or by fermentation processes. In either case, the crude alcohol from the manufacturing operation contains impurities among which are water and a more or less complex mixture of oils, a well known example being fusel oil in fermentation ethyl alcohol. These oils boil over a range well above the boiling point of the alcohol and have a very strong odor. They are substantially completely soluble in the dry alcohol but are only very slightly soluble in water; their solubility in alcohol-water mixtures ranges between the two extremes depending upon the concentration of alcohol in the mixture. The presence of more than the slightest trace of these oils in the refined alcohol is very undesirable. In some cases, a few hundredths or even a few thousandths of one percent of these oils will impart an undesirable odor and taste to the alcohol. If the oils contain hydrocarbons, a few hundredths of one percent will cause cloudiness when the alcohol is diluted with water. A trace of certain oils will cause discolorization when the alcohol comes in contact with mineral acids, a disadvantage if the alcohol is to be used for chemical purposes. These facts make it plain that complete removal of the oils is one of the most necessary steps in the alcohol refining operation.

The first step in the usual alcohol refining operation is to pass the crude alcohol through a continuous fractionating column designed and operated to remove as distillate the impurities boiling lower than the alcohol. This column is usually designated as the heads column or the purifying column. The weak alcohol, free of lower-boiling impurities but still containing the impurities boiling higher than the alcohol, is withdrawn from the bottom of this column and pumped to a second continuous column. The function of the second column, usually designated as the concentrating column or rectifying column, is to concentrate the alcohol approximately to its constant-boiling mixture with water and to remove the higher-boiling impurities. Water is discharged from the bottom of this column and the purified concentrated alcohol, produced as an overhead distillate or as a sidestream from a plate near the top of the column, is either marketed as such (e. g. approximately 95% ethyl alcohol or 91% isopropyl alcohol) or is processed further to remove all or part of the remaining water. The oils entering with the feed work down the concentrating column until, at some plate near the bottom of the column, the water concentration is high enough to throw the oils out of solution. The oils then become volatile with steam and are vaporized and driven back up the column until they reach a zone where the alcohol concentration is high enough to redissolve them. But since the oils boil higher than the alcohol, they then tend to be fractionated back down the column. In this way, a zone of maximum oil concentration is formed in the lower sections of the concentrating column, the oil concentration decreasing rapidly below this zone and gradually above it. Within this zone, there are usually two distinct types of oils which reach peak concentrations at two different points, the more water-soluble oils collecting below the less water-soluble oils. For the removal of both types, sidestreams are withdrawn from the column at the two points.

The water concentration in the lower sidestream is fairly high and two phases are usually present, an upper layer of oils containing some alcohol and a lower layer of dilute alcohol containing some oils. The upper layer is usually decanted off and washed with water to recover the alcohol. The lower layer and the washings are returned to the concentrating column, carrying with them an amount of oil which may be even larger than the amount removed with the washed upper layer.

The alcohol concentration in the upper sidestream is high enough to dissolve all the oils and only one phase is present. A common method for removing the oils consists of adding enough water to cause the separation of an oil layer, decanting off the oil layer and returning the dilute alcohol layer to the concentrating column. Again, a large proportion of the oil is returned to the column with the dilute alcohol.

Since the decrease in oil concentration in the second column is gradual above the zone of maximum oil concentration, there is a strong tendency for the product to contain enough oils to reduce its quality. There are two ways by which this may be avoided. First, the concentrating column may be operated at a high reflux ratio which tends to lower the concentration of the oils in the top sections of the column. This method is not as effective as the second method and is not economical because the heat consumption per unit of product is increased and the productive capacity of the concentrating column is decreased. The second method consists of maintaining the smallest possible amount of oils in the concentrating column. This may be done by removing large oil sidestreams from the concentrating column and efficiently removing the oils from these streams before returning the alcohol content to the system. A still more effective way of accomplishing this object combines the latter treatment of the oil sidestreams with reducing the oil content of the crude alcohol to a minimum before feeding to the refining columns. However, as was pointed out above, the oils in the concentrating column sidestreams cannot be efficiently separated from the alcohol in the sidestreams by the usual present methods. As a result, a high concentration of oils must be carried in the concentrating column and the reflux ratio must be kept high to prevent oil contamination of the product. But by utilizing the present invention, the oils and the alcohol in the sidestreams can be very efficiently separated and a high quality product can be obtained at a lower reflux ratio.

The present invention consists of a two-stage extraction process using an oil-extracting solvent and water. The process is most efficiently, although not necessarily, carried out as a continuous operation. Further, if the operation is made continuous and a vertical, gravity-flow countercurrent extractor is used, a minimum of equipment is needed. Such an extractor is shown at 2 in Fig. 1 and consists of a vertical column containing two separate extracting sections. These extracting sections may contain a packing material supported on perforated plates, perforated plates alone, staggered plates or any other device for securing intimate contact between the two counter-flowing liquid phases. Water is pumped in near the top of the extractor through a device which breaks the stream up into many small streams distributed over the cross-section of the column. The oil-extracting solvent, a selected low-boiling organic compound substantially insoluble in water, is pumped through a similar distributing device into a point near the bottom of the column. The alcohol-oil mixture is pumped into the central part of the column through another similar distributor and is at once diluted by the descending stream of water. The oils are partially thrown out of solution since they are only slightly soluble in water. But since the oils are completely soluble in the oil-extracting solvent, they are dissolved in and carried up the extractor by the ascending stream of oil-extracting solvent. As the diluted alcohol, still containing some dissolved oils, flows down through the lower extracting section, the dissolved oils are countercurrently extracted from the dilute alcohol by the ascending fresh oil-extracting solvent. The dilute alcohol withdrawn from the bottom of the extractor is saturated with the oil-extracting solvent but is practically free of oils.

As the oil-extracting solvent rises through the lower extracting section, it dissolves some alcohol in addition to the oils. And since water is quite soluble in the alcohol, the solvent phase contains some water in addition to alcohol and oils as it enters the upper extracting section. In the upper extracting section, the alcohol is countercurrently extracted from the solvent phase by the descending fresh water. The water content of the solvent phase decreases as the alcohol content decreases and the solvent-oil mixture withdrawn from the top of the extractor is nearly free of alcohol and water.

The alcohol content of the solvent phase withdrawn from the top of the extractor may be reduced as low as desired by increasing the volume of water fed in near the top of the extractor and/or by increasing the height of the upper extracting section. Similarly, the oil content of the dilute alcohol withdrawn from the bottom of the extractor may be reduced as low as desired by increasing the volume of oil-extracting solvent fed in near the bottom of the extractor and/or by increasing the height of the lower extracting section.

If it is desired to recover the oil-extracting solvent free of oils, this can be easily accomplished by fractional distillation of the solvent-oil mixture. Since the oils are high-boiling, the solvent is low-boiling and the solvent-oil mixture contains insufficient water to cause steam distillation of the oils, the fractionating column need contain only a few plates. To prevent steam distillation of the oils, the column must be heated by some means other than direct steam. The recovered solvent, oil-free, is withdrawn as distillate and the dry oils are withdrawn from the bottom of the column.

The extracted dilute alcohol from the bottom of the extractor will contain a small amount of the oil-extracting solvent corresponding to the small solubility of the solvent in the dilute alcohol. However, the solvent can be easily separated completely from the dilute alcohol by fractional distillation; for example, by running the extracted dilute alcohol through the heads column of the alcohol refining unit. The solvent is removed in the distillate stream and the solvent-free dilute alcohol is removed from the bottom of the fractionating column.

From the above description, it is seen that an oil-extracting organic selective solvent should be selected which has the following properties:

1. Low-boiling, so that it may be easily separated from the oils and from the bulk of the dilute alcohol by fractional distillation. It should not form a constant-boiling mixture with the oils since this would prevent the desired separation. However, the solvent will generally form constant boiling mixtures with the alcohol but it will be shown that this does not interfere.

2. Substantially insoluble in water so that two liquid phases will be present in the extractor and so that the extracted dilute alcohol will contain only a small amount of the solvent.

3. Substantially completely miscible with the oils. Practically all the known organic compounds fulfilling requirements (1) and (2) have this property.

4. The density of the solvent should be sufficiently different from that of the dilute alcohol so that countercurrent gravity flow in the extractor is possible. The above description of the extractor operation is confined to the more common case where the solvent has the lower density. However, a solvent having a higher density than the dilute alcohol could be used by introducing the solvent near the top and water near the bottom of the extractor.

The following are some of the classes of compounds from which the oil-extracting solvent can be selected. It is to be understood that selection of a specific member of any of these groups will depend upon the properties of the alcohol and the oils to be separated from the alcohol: lower aliphatic symmetrical and mixed ethers; lower aromatic, aliphatic and alicyclic hydrocarbons; halogenated derivatives of the above ethers and hydrocarbons.

Examples of suitable solvents in the classes described are:

Lower aliphatic symmetrical and mixed ethers, e. g. isopropyl ether, ethyl isopropyl ether, methyl tertiary butyl ether, di-sec.-butyl ether, ethyl tertiary butyl ether, etc.

Lower aliphatic and alicyclic hydrocarbons, e. g. pentane, hexane, heptane, light naphthas, cyclohexane, diisobutylene, and other hydrocarbons up to those boiling about 40° above the alcohol to be purified. Hydrocarbons of the unsaturated variety which polymerize too rapidly to form heavy high boiling oils are not preferred for the extraction process.

Aromatic hydrocarbons, e. g. benzene, toluene and their low-boiling aliphatic derivatives.

Halogenated hydrocarbons, e. g. carbon tetrachloride chloroform, ethylene dichloride, other halogenated paraffins and other chlorinated hydrocarbons which do not hydrolyze too rapidly with water.

Some specific examples will illustrate some of the ways in which the present invention can be fitted into a complete alcohol refining operation. Although the following examples will be confined to the refining of crude isopropyl alcohol produced by the hydration of propylene, the process is not limited to this case. The process is applicable to any case where ethyl, n-propyl, isopropyl, n-butyl, isobutyl, sec.-butyl, tert.-butyl alcohol or any unsaturated alcohol, e. g. allyl alcohol, containing two to four carbon atoms or a mixture of these alcohols is to be separated from high-boiling oils. The following examples will also be confined to continuous extraction; batch extraction may also be used, if desired.

The following are approximate typical compositions of the crude alcohols when finishing crude fermentation ethyl alcohol, crude isopropyl alcohol, and crude secondary butyl alcohol by the process of this invention:

Crude ethyl alcohol

35% ethyl alcohol (by volume)
0.5% fusel oil (by volume)
Balance—water and other impurities

Crude isopropyl alcohol

55% isopropyl alcohol (by volume)
3% polymer oils (by volume)
2% isopropyl ether (by volume)
Balance—water and other impurities

Crude secondary butyl alcohol

75% butyl alcohols (by weight)
4% polymer oils (by weight)
5% sec.-butyl ether (by weight)
Balance—water and other impurities Referring now more specifically to the processes described in the drawings which are elevational views of apparatus suitable for carrying out our invention, Figure 1 represents a flow plan of a continuous isopropyl alcohol finishing unit with combination water-solvent extraction of polymer oils from the crude alcohol feed and the concentrating column oil sidestreams. Figure 2 represents a flow plan of a continuous isopropyl alcohol finishing unit with similar combination water-solvent extraction of polymer oils. In this case, the crude alcohol contains low-boiling water-soluble impurities, e. g. acetone, which are undesirable in the alcohol product.

Example I

Returning to Figure 1, crude isopropyl alcohol of the composition outlined above is pumped from tank 1 via lines 3 and 4 to the central inlet of a large two-stage extractor 2. Isopropyl ether, from a source to be later described, is fed in near the bottom of the extractor through line 5 and water is fed in near the top of the extractor through line 6. The crude alcohol, ether and water streams may be fed to the extractor through suitable distributing devices such as sprayheads, etc. Isopropyl ether plus polymer oils are withdrawn at the top of the extractor through line 7, run to surge tank 8, and from there pumped to fractionating column 10 through line 9. Column 10 is heated by reboiler 41. Column 10 operates to separate the ether from the oils, the substantially oil-free ether distillate being taken overhead through line 11, condensed in condenser 12 and removed via lines 13 and 15 to ether storage tank 16. Part of the ether is removed from line 13 and returned to column 10 as reflux via line 14. Ether for solvent purposes is withdrawn from tank 16 via line 17 to the extractor via line 5 as previously recited. Polymer oils are withdrawn as bottoms from column 10 by pipe 18 and led to storage tank 19 for disposal.

The substantially oil-free crude dilute alcohol is withdrawn from the bottom of extractor 2 by pipe 20, run to surge tank 21, and pumped from there through line 22 through the heads column 23 to the concentrating column 30. The heads column 23 is operated in a manner so as to take overhead through line 24 a distillate approaching in composition the ternary azeotrope of isopropyl alcohol-isopropyl ether-water. This distillate is condensed in condenser 25 removed by pipes 26 and 28 to recycle line 39 for return to the extractor via line 4. Part of the distillate is returned to the top of the clumn 23 as reflux via pipe 27. Dilute alcohol, free of isopropyl ether and substantially free of polymer oils is withdrawn from the bottom of heads column 23 via pipe 29 and fed to a plate near the bottom of concentrating column 30, which is heated by open steam or a reboiler (not shown). The traces of oils remaining in the crude alcohol accumulate in the bottom sections of the concentrating column and are withdrawn from the two points of maximum concentration via lines 37 and 38 and returned to the extractor via recycle line 39 and feed pipe 4. Water is removed from the column by pipe 40.

The refined oil-free product, 91% isopropyl alcohol, is withdrawn from a plate near the top of the concentrating column and run to storage tank 32 via line 31. As is customary in alcohol refining practice, a small portion of the overhead distillate leaving tower 30 via line 33 is returned, after condensation in condenser 34, to the heads column 23 via line 36 in order to keep out of the final product any traces of heads formed in the concentrating column, or not originally removed in the heads column. Part of the condensed overhead distillate is also refluxed to the top of the concentrating column via line 35.

The isopropyl alcohol finishing system described is one in which isopropyl ether was present in the feed and thus available for use as a solvent for the polymer oils. The system could also be adapted to handle a crude alcohol containing oils but no isopropyl ether. In this case, a batch of isopropyl ether or other suitable oil-extracting solvent would be added to the system at the start of the operation. All this solvent would be separated from the oils by fractionation in tower 10 and recycled as shown. After the first addition, the only additional solvent required would be that necessary to compensate for small inevitable losses.

*Example II*

Referring now to Figure 2 of the drawings, a process will be described for the finishing of crude isopropyl alcohol containing a water-soluble heads impurity, e. g. acetone, which is not acceptable in the final product. The amount of acetone in the feed is approximately ½ of 1% based on the amount of alcohol in the crude feed; otherwise the feed composition is substantially the same as that fed to the system described in Figure 1. The operation of the process according to Figure 2 is similar to that of Figure 1 except in the operation of the heads column and in the addition of a small one-stage extractor.

In Figure 2 the crude isopropyl alcohol containing the water-soluble heads impurity, e. g. acetone, is led from storage tank 51 via lines 53 and 54 into the central portion of a large two-stage extractor 52. Isopropyl ether is pumped from storage tank 66 which will be more fully described, into the bottom of extractor 52 by pipes 67 and 55. Water is fed to the extractor at the top through line 56. Isopropyl ether plus polymer oils are withdrawn at the top of the extractor through line 57, run to surge tank 58 and then pumped to fractionating column 60 through pipes 59. Column 60 is heated by reboiler 99. This column is operated in a manner to separate the ether from the polymer oils, the substantially oil-free ether distillate being taken overhead through line 61, condensed in condenser 62 and removed via lines 63 and 65 to ether storage tank 66. Part of the ether is removed from line 63 and returned to column 60 as reflux via pipe 64. Polymer oils are withdrawn as bottoms from column 60 via line 68 and led to storage tank 69 for appropriate disposal.

The substantially oil-free crude dilute isopropyl alcohol containing the dissolved acetone is withdrawn from the bottom of extractor 52 by pipe 70, run to surge tank 71 and pumped from there through pipe 72 to the central portion of heads column 73. The heads column is operated so that distillate composition taken overhead via line 74 approximates the acetone-isopropyl ether constant boiling mixture. On this point the operation of the heads column differs from the operation of the heads column in Figure 1 where the overhead distillate approached the isopropyl ether-isopropyl alcohol-water constant boiling mixture. The acetone-ether distillate, condensed in condenser 75 is conducted via lines 76 and 78 to the bottom inlet of a small single-stage extraction tower 79. Part of the distillate is refluxed via line 77 to the top of the heads column.

Water is fed to the top inlet of extractor 79 via pipe 80 and the acetone is counter-currently extracted from the ether by the water. Ether is recovered at the top of the extractor substantially free of acetone and run to tank 66 along with the oil-free ether distillate from the oil-ether column 60. From the bottom of extractor 79 dilute acetone containing a small amount of ether is run via lines 82 and 83 to tank 84 for appropriate disposal. If the feed to the heads column contains a lower ratio of acetone: isopropyl ether than the heads column distillate, it is necessary to return enough dilute acetone to the heads column to prevent a partial depletion of acetone in the heads column. Pipe 85 is provided to supply dilute acetone to the heads column. If the acetone in the heads column were sufficiently depleted, the distillate would contain some of the isopropyl ether-isopropyl alcohol-water constant boiling mixture and the stream withdrawn from the bottom of extractor 79 would contain isopropyl alcohol in addition to acetone.

Returning now to heads column 73, the dilute alcohol, now substantially free of any oily polymers and stripped of its low-boiling impurities, is withdrawn as bottoms by pipe 86, run to surge tank 87 and pumped via line 88 to a plate near the bottom of concentrating column 89 which is heated by open steam or a reboiler (not shown). The operation of column 89 is similar to that of column 30 in Figure 1. The refined oil-free product, 91% isopropyl alcohol, is withdrawn from a plate near the top of the column and run to storage tank 91 via line 90. A small portion of the overhead distillate leaving column 89 via 92 is returned, after condensation in condenser 93, to the heads column 73 via line 95 in order to keep out of the final alcohol product any traces of heads formed in the concentrating column or not originally removed in the heads column. Part of the condensed distillate is refluxed to the top of the column via line 94. The traces of oils remaining in the crude alcohol accumulate in the botttom sections of the concentrating column and are withdrawn from the two points of maximum concentration via lines 96 and 97 and returned to the extractor 52 via recycle line 98 and feed line 54. Water is withdrawn from the bottom of column 89 via pipe 100.

Again, the crude alcohol feed need not contain isopropyl ether or any other oil-extracting solvent, in which event a batch of suitable oil-extracting solvent would be added to tank 66 at the start of the operation.

The modification of the invention as shown in Figure 2 has been described for the isopropyl alcohol system containing acetone as a soluble "heads" impurity. The process, as described, is also applicable to the secondary butyl alcohol finishing process wherein one or all of the water-soluble heads impurities viz., methyl ethyl ketone, isopropyl alcohol or tertiary butyl alcohol, are removed.

The above examples have been described for a system wherein crude isopropyl alcohol was being freed of polymer oils by extraction with isopropyl ether in the manner described. In the isopropyl alcohol finishing other solvents could be employed but isopropyl ether is preferred because it is already present in the crude alcohol due to the nature of the process by which the alcohol was prepared.

In the case of secondary butyl alcohol, there is usually present in the crude alcohol diisobutylene and di-sec.-butyl ether which may be used as the oil-extracting solvent just as the isopropyl ether is preferred in the refining of isopropyl alcohol. In the case of the other butyl alcohols, the process is applicable in those cases where the overhead in the second column is the butyl alcohol-water azeotrope.

Ethyl alcohol is normally finished in the manner described above for isopropyl alcohol.

It will be observed that the examples above-described were concerned with the use of a solvent of a density lower than that of water. However, it is to be understood that the process is equally applicable to systems in which a solvent of specific gravity greater than water may be employed, for example, carbon tetrachloride. When a solvent is employed whose density is higher than water and higher than that of the dilute alcohol, the solvent is introduced near the top of the extraction zone and the water is introduced near the bottom of the extraction zone. The density of the solvent should be sufficiently different from that of the dilute alcohol so that countercurrent gravity flow in the extractor is possible.

We claim:

1. A process for the removal of high-boiling substantially water-insoluble oils and low-boiling water-soluble impurities from crude aliphatic alcohols of 2 to 4 carbon atoms which comprises introducing the crude alcohol into a vertical extraction zone at a point near the mid-section thereof, introducing water into one end of said extraction zone, introducing a low-boiling substantially water-insoluble organic solvent into the other end of said extraction zone, removing substantially alcohol-free solvent containing dissolved oils from the end of the extraction zone at which the water is introduced, removing substantially oil-free alcohol, water and low-boiling water-soluble impurities from the other end of said extraction zone, introducing the substantially oil-free alcohol, water and low-boiling water-soluble impurities into a fractionation zone, recovering alcohol and water as bottoms from the fractionation zone, removing the low-boiling water-soluble impurities and the low-boiling water-insoluble organic solvent as distillate from the fractionation zone, and extracting the distillate with water to recover the water-soluble impurity and the solvent therefrom.

2. A process for the removal of high-boiling substantially water-insoluble oils and acetone from crude isopropyl alcohol which comprises introducing the crude alcohol into a vertical extraction zone at a point near the mid-section thereof, introducing water into one end of said extraction zone, introducing isopropyl ether into the other end of said extraction zone, removing substantially alcohol-free isopropyl ether containing dissolved oils from the end of the extraction zone at which the water is introduced, removing substantially oil-free alcohol, water and acetone from the other end of said extraction zone, introducing the substantially oil-free alcohol, water and acetone into a fractionation zone, recovering alcohol and water as bottoms from the fractionation zone, removing the acetone and isopropyl ether as distillate from the fractionation zone, and extracting the distillate with water to recover acetone and isopropyl ether therefrom.

3. A method for the production of a refined aliphatic alcohol containing from 2 to 4 carbon atoms from a crude aliphatic alcohol containing high-boiling substantially water-insoluble oils and a low-boiling water-soluble impurity which comprises introducing the crude alcohol into a vertical extraction zone at a point near the mid-section thereof, introducing water into one end of said extraction zone, introducing a low-boiling substantially water-insoluble organic solvent into the other end of said extraction zone, removing solvent containing dissolved therein the bulk of the oils from the end of said extraction zone at which the water is introduced, removing alcohol and water containing traces of oils and the low-boiling water-soluble impurity from the other end of said extraction zone, introducing the alcohol and water containing traces of oils into a fractionation zone, removing water-soluble impurity as distillate from the fractionation zone, extracting the distillate with water to recover the water-soluble impurity and water-insoluble solvent therefrom, introducing the alcohol and water containing traces of oils recovered as bottoms from said fractionation zone into a concentration zone and recovering refined aliphatic alcohol containing from 2 to 4 carbon atoms as distillate from the concentration zone.

4. A method for the production of refined isopropyl alcohol according to claim 3 in which the crude alcohol is isopropyl alcohol and in which the low-boiling water-soluble impurity is acetone.

5. A method for the production of refined secondary butyl alcohol according to claim 3 in which the crude alcohol is secondary butyl alcohol and in which the low-boiling water-soluble impurity is a substance selected from the group consisting of methyl ethyl ketone, isopropyl alcohol and tertiary butyl alcohol.

RAYMOND W. EGBERTS.
JOHN HOOTON.

REFERENCES CITED

The following references are of record in the file of this patent:

UNITED STATES PATENTS

| Number | Name | Date |
|---|---|---|
| 1,498,274 | Heuser | June 17, 1924 |
| 1,712,475 | Buc | May 7, 1929 |
| 2,023,109 | Van Dijck | Dec. 3, 1935 |
| 2,081,721 | Van Dijck et al. | May 25, 1937 |
| 2,274,750 | Soenksen et al. | Mar. 3, 1942 |